May 9, 1944.  B. B. MINNIUM  2,348,693
ELECTRIC CAPACITOR
Filed Feb. 5, 1942
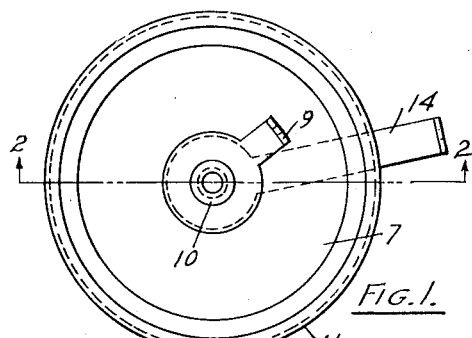
Fig. 1.
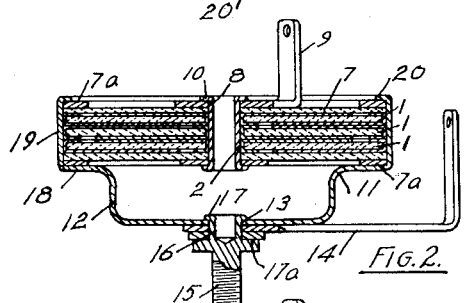
Fig. 2.
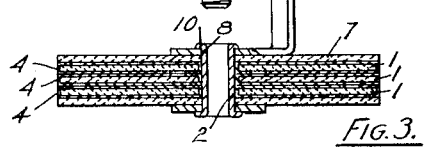
Fig. 3.
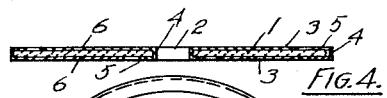
Fig. 4.
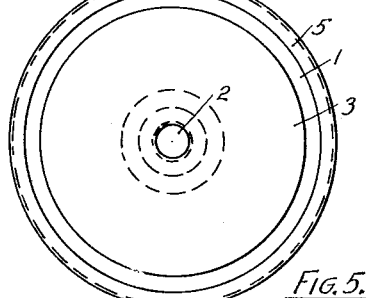
Fig. 5.
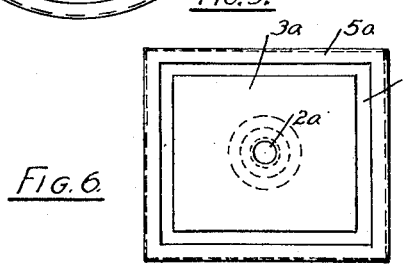
Fig. 6.
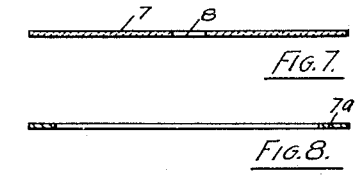
Fig. 7.
Fig. 8.
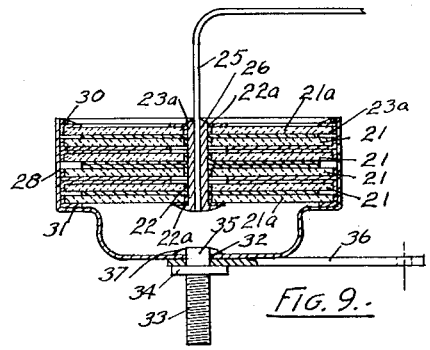
Fig. 9.
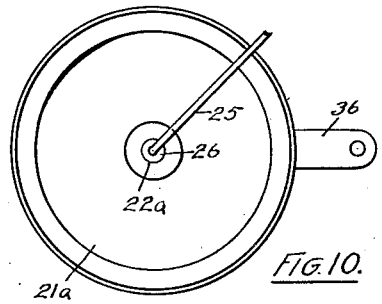
Fig. 10.
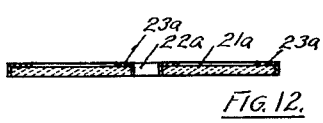
Fig. 12.
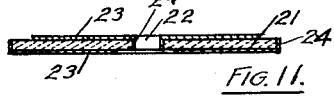
Fig. 11.
Byron B. Minnium
INVENTOR
BY 
ATTORNEY Patented May 9, 1944

2,348,693

UNITED STATES PATENT OFFICE 2,348,693

ELECTRIC CAPACITOR

Byron B. Minnium, Erie, Pa., assignor to Erie Resistor Corp., Erie, Pa., a corporation of Pennsylvania Application February 5, 1942, Serial No. 429,645

2 Claims. (Cl. 175—41)

Capacitors have been made in two general forms. One form, which may be referred to as the book type, consists of alternate plates or layers of conducting material and insulating material such as mica or ceramics, and the other type consisting of tubes of dielectric material with one conductor on the inside and the other on the outside surface of the dielectric tube.

In the first type mentioned, connections to the alternate plates are ordinarily made by extending the plates so that they project first on one side of the pile and then on the other, one set of plates having leads for one terminal and the other for the opposite terminal.

In both types the flow of current into the capacitor is from one edge of both plates or groups of plates to the opposite edge. With high frequencies such as are in use, especially in the radio field, at present, the self inductance of the relatively long leads and the relatively long path across the plates from one edge to the opposite edge of the plate structure makes the construction described generally unsatisfactory.

With the present invention the pile is made up of alternate plates and conductors, one set of conductors having its lead in the area within the edges and the other having its lead from the edges or points closer thereto than the first mentioned lead. With this construction, therefore, the path of the current through the conductor is shortened and this lowers the series resistance and the inductance.

In the accompanying drawing we have shown two forms of dielectric plates, one using a mica and the other a ceramic material. In many respects the mica is superior in that it can be flexed. It is very much thinner, more compact, and less expensive. Where the conductors are formed with plating, the bond between the mica and the plating is not sufficient to be depended upon for securing the plates or the leads. The ceramic material forms a satisfactory bond with the plating forming a conductor so that it may be utilized as a securing means by the mere application of solder, but the ceramic plates are thicker and more fragile.

Where the securing means of the plates is accomplished by pressure engagement between the plates, there is a definite disturbance incident to temperature and other conditions, which is undesirable. The ordinary method of securing mica plates has this fault. The present invention obviates this by confining the pressure area to neutral areas which are not involved in the capacity of the capacitor.

It is desirable to moisture-proof the dielectric plates so as to render them immune to variations in moisture conditions. This has heretofore been attempted but with materials that shift their fluid relation within the range of ordinary atmospheric changes of temperature.

I have discovered that if the material used is a liquid and is of such a character that it remains liquid through ordinary atmospheric changes of temperature, avoidance of disturbances due to the change from liquid to solid is obviated. Similarly wax has been utilized for this purpose but with such materials that have been used, the wax liquifies within ordinary atmospheric temperature and this again effects a disturbance which is obviated in the present invention.

Features and details of the invention will appear from the specification and claims.

The invention is illustrated in the accompanying drawing as follows:

Fig. 1 shows a plan view of the invention.

Fig. 2 a section on the line 2—2 in Fig. 1.

Fig. 3 a view similar to Fig. 2 but without the outer case.

Fig. 4 a section of an individual dielectric unit of the capacitor.

Fig. 5 a plan view of the unit in round form.

Fig. 6 a similar view of the unit in rectangular form.

Fig. 7 a sectional view of the dielectric plate.

Fig. 8 a section of a spacing or binding plate.

Fig. 9 a section of an alternative construction.

Fig. 10 a plan view of the same.

Fig. 11 a sectional view of one of the units of the capacitor.

Fig. 12 an end unit used in securing the pile.

In the construction shown in Figs. 1 to 8, 1 marks a dielectric plate of a unit; 2 an opening through the plate, preferably at the center; 3 a plating on opposite faces of the plate; 4 a continuation of this plating across the edges of the plate, both at the opening and outer edge, 5 return extensions of the platings on opposite sides of the dielectric plate.

Thus it will be noticed in that part of the capacitor unit in which the plating on both sides is the same conductor, this part of the unit is neutralized and consequently does not affect the capacity of the unit. On the other hand, the plating is extended at both sides of the plate so as to have overlapping portions 6, and this portion of the unit is the active portion. Consequently if the securing pressure is confined to the area along the edge or to the inactive part of the unit, temperature disturbances do not occur as where this pressure area extends into the active part of the unit.

The units are arranged in a pile to give the capacitor the capacity desired, having the openings 2 in register. A non-conducting plate 7 having an opening 8 is also provided for the ends. A terminal 9 has an opening that registers with the opening 2 and an eyelet 10 is passed through the registered openings, flanged over at each end, thus securing all the plates of the pile rigidly together and forming a conductor connection, between the several conductors of the units and the terminal 9. The pressure incident to the setting of the eyelet is entirely exerted on the inactive part of the unit so that temperature changes do not disturb the active part of the unit which is free from this pressure.

It is preferable to secure the outer edges also, and to this end a case 11 is used. This case has a crown or extension 12 having an opening 13 through the center thereof. A terminal 14 is provided having an opening in register with the opening 13. A securing stud 15 has a projection 16 extending through the openings in the terminal and crown. This stud has a shoulder 17a engaging the terminal and is headed at 17, thus firmly securing the case. The stud in connection with the case forms a convenient manner of mounting the unit.

The case has a cylindrical portion 19 which is joined to the crown through a flanged portion 18. This portion 18, engaging the plate 7 and the opposite end of the cylindrical portion, is headed over at 20, a spacer ring 7a engaging the opposite closure plate at the opposite end of the pile, thus securing the several units of the pile at each edge. Here again, the pressure incident to this manner of securing these units is confined to the inactive part of the edges of the units, consequently the active part of the unit is not disturbed with temperature changes by reason of such pressure.

In the alternative construction, dielectric plates 21 are of ceramic material. These have openings 22. Conductors are formed by plating 23 on the surfaces of the dielectric plate, the plating at 24 being carried over the edges, one plating extending through the edge of the opening and the other plating of each unit extending over the outer edge of the plate.

At both ends of the pile a closing unit 21a is used, having openings 22a. This has a metal covering 23a extending from the outer surface over the edges, both at the opening and the outer edge.

A terminal 25 extends into the opening of the pile and this opening is filled with solder 26, thus uniting the conductor and securing the several units of the pile together. An outer case 27 has a cylindrical portion 28 which extends around the pile, and contacts the edges 24 of one set of conductors. One end of the case is secured by solder 30 extending entirely around the edge. The opposite end of the cylindrical portion has the flanged or flat part 31 which engages the opposite end of the pile.

The case has a crown with a central opening 32. A stud 33 has a shoulder 34 and a projection 35. A terminal 36 has an opening through which the projection extends, the projection also extending through the opening 32. The projection is headed over at 37, thus securing the stud to the case.

As a means of moisture-proofing that will stay constant as to fluidity through ordinary operative ranges of temperature, I have found that transformer oil obtained by the fractional distillation of crude petroleum without subsequent chemical treatment having the following characteristics,

|  | Light (Transil—10c) |
|---|---|
| Flash point_____degrees centigrade__ | 133 |
| Fire point_____do____ | 148 |
| Freezing point_____do____ | —40 |
| Density_____ | 0.87 (at 15 deg.) |
| Viscosity (Seybolt)___seconds__ | 57 (at 37.8 deg.) |
| Acid, alkali, sulphur and moisture_____ | None | will accomplish the purpose.

What I claim as new is:

1. In an electric capacitor, the combination of a pile of dielectric plates, each plate having an opening therethrough, conductors bonded on opposite faces of said plates, the edges of the opposite conductors being spaced from the opposite edges of the plates, one conductor having its other edge extending over the edge of the opening, the other conductor having its other edge extending over the outer edge of the plate, the turned over edges of the conductor having return portions along the opposite faces of the plates spaced from the opposing conductors, a pressure ring on the outside edge of each of the outer plates, a plurality of means for securing said plates together, one at the center and the other at the periphery, said latter means contacting the pressure ring, said means being so disposed as to apply pressure as far as possible from the active area of the plates, whereby the capacity is substantially independent of the pressure exerted by the securing means.

2. In an electric capacitor, the combination of a pile of dielectric plates, each plate having an opening therethrough, conductors bonded on opposite faces of said plates, the edges of the opposite conductors being spaced from the opposite edges of the plates, one conductor having its other edge extending over the edge of the opening, the other conductor having its other edge extending over the outer edge of the plate, the turned over edges of the conductor having return portions along the opposite faces of the plates spaced from the opposing conductors, a pressure ring on the outside edge of each of the outer plates, a plurality of means for securing said plates together, one at the center and the other at the periphery, said latter means contacting the pressure ring, said means being so disposed as to apply pressure as far as possible from the active area of the plates, whereby the capacity is substantially independent of the pressure exerted by the securing means, the pile being moisture proofed to preserve the inherent temperature-capacity stability of the capacitor.

BYRON B. MINNIUM.